United States Patent
Datar et al.

(10) Patent No.: US 12,131,164 B2
(45) Date of Patent: Oct. 29, 2024

(54) END-TO-END TOPOLOGY STITCHING AND REPRESENTATION

(71) Applicant: Hewlett Packard Enterprise Development LP, Houston, TX (US)

(72) Inventors: Ashutosh Datar, San Jose, CA (US); Anagha Barve, San Jose, CA (US); Madhumita Bharde, Andover, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 488 days.

(21) Appl. No.: 17/486,888

(22) Filed: Sep. 27, 2021

(65) Prior Publication Data

US 2023/0102572 A1    Mar. 30, 2023

(51) Int. Cl.
*G06F 9/445* (2018.01)
*G06F 7/14* (2006.01)

(52) U.S. Cl.
CPC ............ *G06F 9/44505* (2013.01); *G06F 7/14* (2013.01)

(58) Field of Classification Search
None
See application file for complete search history.

(56) References Cited

U.S. PATENT DOCUMENTS

| | | | |
|---|---|---|---|
| 9,053,000 B1 | 6/2015 | Lam et al. | |
| 9,413,685 B1 | 8/2016 | Lam et al. | |
| 10,009,443 B1 | 6/2018 | Guigli | |
| 10,129,092 B2 | 11/2018 | Guigli | |
| 10,255,061 B2 | 4/2019 | Lander et al. | |
| 10,270,796 B1 | 4/2019 | Veeraswamy et al. | |
| 10,324,759 B1* | 6/2019 | Paquette | H04L 67/10 |
| 10,608,892 B2 | 3/2020 | Savov et al. | |
| 2016/0048408 A1 | 2/2016 | Madhu et al. | |
| 2016/0366233 A1 | 12/2016 | Le et al. | |
| 2018/0032603 A1 | 2/2018 | Gonzalez et al. | |
| 2019/0068400 A1* | 2/2019 | Krikorian | H04L 12/66 |
| 2019/0068445 A1* | 2/2019 | Chauhan | H04L 67/10 |
| 2019/0146810 A1* | 5/2019 | Ganesh | H04L 43/0888 718/1 |
| 2020/0322230 A1* | 10/2020 | Natal | H04L 41/5019 |
| 2022/0214998 A1* | 7/2022 | Mutnuru | H04L 41/0816 |

OTHER PUBLICATIONS

Datadog, "APM & Continuous Profiler," 2021, 7 pages, Retrieved from Internet on Aug. 23, 2021 at URL: docs.datadoghq.com/tracing/.

(Continued)

*Primary Examiner* — Craig C Dorais
(74) *Attorney, Agent, or Firm* — Dickinson Wright

(57) ABSTRACT

End-to-end topology stitching and representation is described. An example includes instructions for receiving, at a server, a set of configuration data for an infrastructure stack, the set of configuration data including configuration data for each of a plurality of domains of the infrastructure stack; parsing the received set of configuration data; stitching together an end-to-end topology for the plurality of domains of the infrastructure stack based at least in part on the parsed set of configuration data; and generating a representation of the end-to-end topology of the infrastructure stack.

20 Claims, 11 Drawing Sheets

(56) References Cited

OTHER PUBLICATIONS

Datadog, "Modern Application Performance Monitoring (APM)," 2021, 9 pages, Retrieved from Internet on AUg. 23, 2021 at URL: datadoghq.com/product/apm/.

Device42, "Application Dependency Mapping," 2021, 6 pages, Retrieved from Internet on Aug. 17, 2021 at URL: device42.com/features/application-mappings.

Device42, "Auto Discovery," 2021, 8 pages, Retrieved from Internet on Aug. 17, 2021 at URL: docs.device42.com/auto-discovery/.

Device42, "Discovery Everything," 2021, 15 pages, Retrieved from the Internet on Aug. 17, 2021 at URL: device42.com/discovery/.

Turbonomic, Inc., "Turbonomic 8.2.7 User Guide," Aug. 19, 2021, 408 pages.

Wikipedia, "Configuration management database," Jun. 21, 2021, 3 pages, Retrieved from Internet on Aug. 17, 2021 at URL: en.wikipedia.org/wiki/Configuration_management_database.

\* cited by examiner

END-TO-END TOPOLOGY STITCHING AND REPRESENTATION

BACKGROUND

In a complex computing environment, there are numerous layers of an infrastructure stack that are interconnected. The multiple layers may include domains for the application, operating system, virtualization, compute, and storage of the environment, with each domain including multiple entities that may interconnect with various entities in other domains.

BRIEF DESCRIPTION OF THE DRAWINGS

Examples described here are illustrated by way of example, and not by way of limitation, in the figures of the accompanying drawings in which like reference numerals refer to similar elements.

DETAILED DESCRIPTION

Examples described herein are directed to end-to-end topology stitching and representation.

In a complex system with multiple layers (also referred to herein as domains) in an infrastructure stack, there is a need for end-to-end visibility into alerts and issues. However, the full infrastructure stack includes multiple disparate layers of physical, virtualized, and clustered components. Each layer in the stack may provide visibility about the configuration of entities managed by that layer, but the data regarding each such layer may not provide a view of the full range of the stack. As a result, it is difficult to ascertain and evaluate the status of the full environment.

Examples described herein may provide for cross domain configuration extraction, topology mapping, and topology representation to provide application insights for layers of an infrastructure stack. Examples described herein may provide for stitching together a topology across the multiple disparate layers of an infrastructure stack, and providing a representation of the full topology for a user. The end-to-end topology may be across some or all layers such as the application, operating system (OS), virtualization, compute, and storage layers.

The generation of the end-to-end topology includes extracting configuration values from each layer (which may be performed on premises at the local system using collected data), parsing the configuration values to identify the configuration information; stitching together an end-to-end topology based on the configuration information (which may be performed over time as, for example, an overwrite of a previous configuration, an incremental change in configuration, or a delta configuration), and generating a representation of the topology (wherein configuration parsing, topology stitching, and representation generation may be performed on a backend system).

Figure 1:
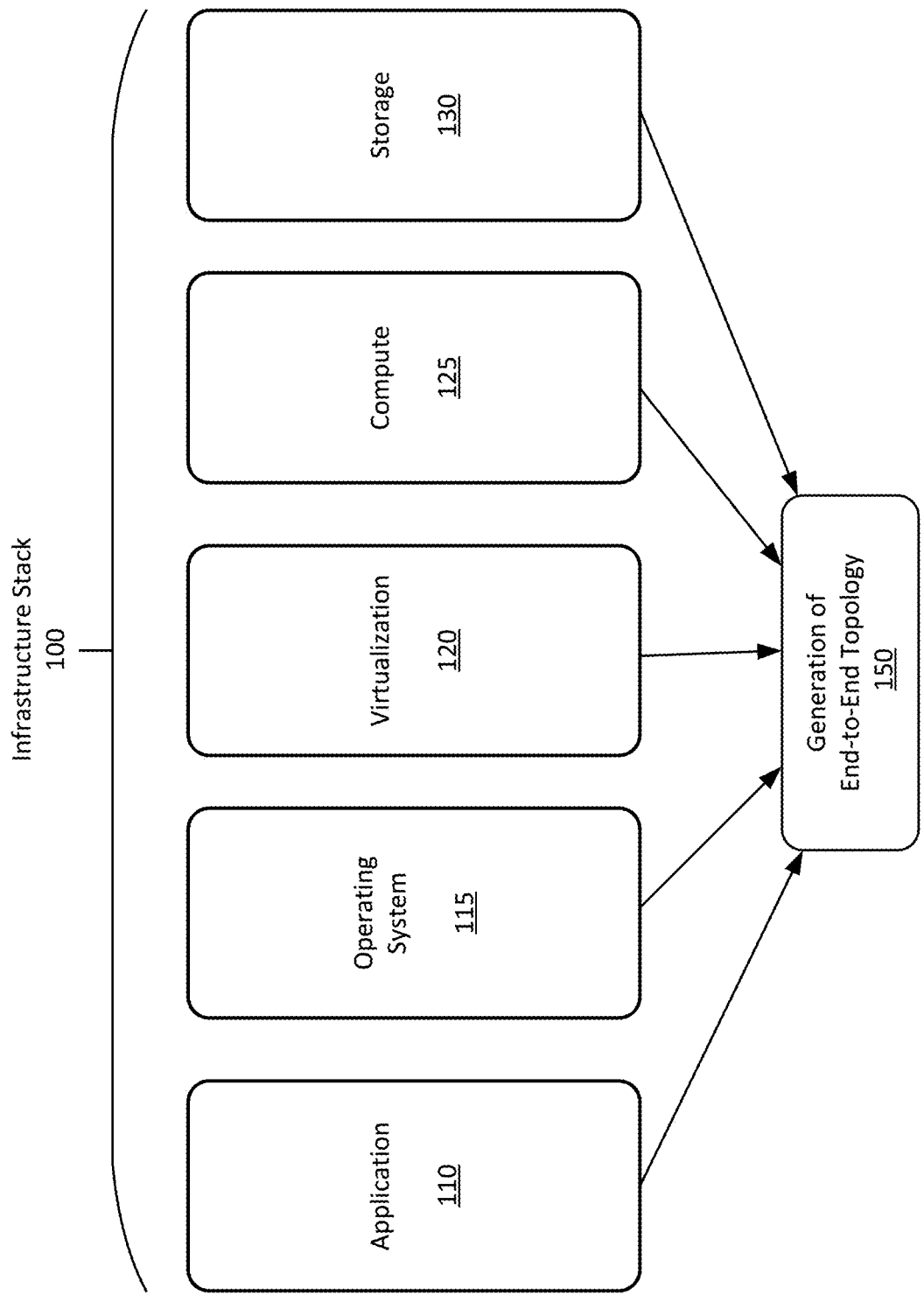
FIG. 1 is an illustration of an example infrastructure stack for topology stitching.

FIG. 1 is an illustration of an example infrastructure stack for topology stitching. An infrastructure stack 100 includes example stack layers including an application 110; an operating system (OS) 115; a virtualization layer 120; a compute layer 125 (which may include servers); and a storage 130. While such layers are interconnected, the layers are largely opaque to each other, and thus there are barriers to collecting the required information from other layers to provide a full end-to-end topology. All layers of the stack generally involve specialized administrative roles and do not have knowledge and visibility into other parts.

Independently collecting configuration information and providing the ability to stitch such configuration information together at a backend server can address the existing barriers to topology generation. The configuration information is stitched together by matching like attributes or properties in the configuration data from different layers of the infrastructure stack. Because the layers 110-130 are opaque to each other, an example provides generalized and formalized collecting and leveraging of configuration information. The operations are modularized to address the differing elements, and to assist in leveraging and extending open source configuration collectors and libraries.

Examples described herein may provide for generation of an end-to-end topology 150 for the layers of the infrastructure stack 100. The generation of the end-to-end topology 150 may include all or a specific subset of the layers of the infrastructure stack, depending on the requirements for a particular topology request.

Table 1 shows a non-exhaustive set of entities and relationships for an example MS SQL deployment on Windows with ProLiant, VMware, and Nimble. The table contains a current set of domains and entities for which configuration information may be collected. However, examples are not limited to these elements, but rather may include any set of domains, and multiple different entities within such domains. Entities may be understood to be aspects that are managed by and at the associated domain. The entities and their attributes are part of the metadata used by multiple domains for end to end topology formation. For supporting additional domain types, the metadata layer is extended to add additional schemas and specifications.

TABLE 1

| Domain | Domain Type Examples | Entities |
| --- | --- | --- |
| Application | MS SQL | Instance, Database, Database Files |
| OS | Windows | OS, Physical Drive, Logical Drive, Network Adapter |
| Virtualization | VMware | Host, Datastore, VM, VMDK, Network adapter |
| Compute | HPE ProLiant | Server |
| Storage | Nimble | Volume, Pool, Array |

Figure 2:
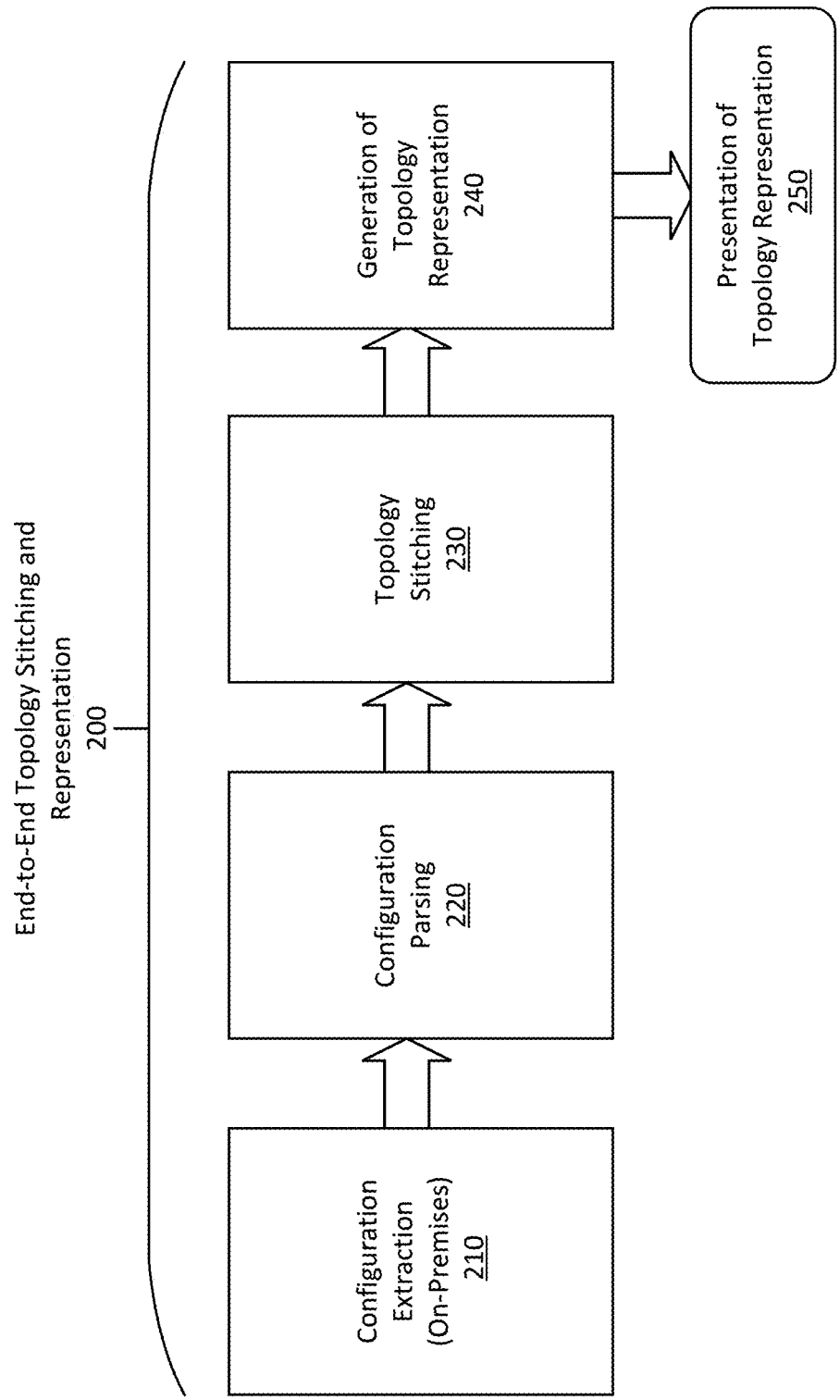
FIG. 2 is a high-level illustration of generation of an end-to-end topology for a stack according to an example.

FIG. 2 is a high-level illustration of generation of an end-to-end topology for a stack according to an example. Examples described herein may provide at least the following to provide end-to-end topology stitching and representation 200:

(1) Configuration extraction 210—Extracting or obtaining configuration data from all or a portion of the plurality of layers of an infrastructure stack, wherein the configuration data may be generated on premises. The configuration data may be extracted independently in each of the domains. Further, the extracted configuration data may be transformed into a standard or generic format for processing by a backend system. The configuration data includes identification of entities that are within a layer and attributes of these identified entities.

(2) Configuration Parsing 220—Parsing of the extracted configuration data from the layers of the infrastructure stack to identify a set of configuration data that can be stitched together for the layers.

(3) Topology stitching 230—Stitching together the end-to-end topology of all or a portion of the infrastructure stack based on the extracted and parsed configuration data.

(4) Topology Representation 240—Generating a representation of the stitched topology, wherein the representation may vary depending on the implementation and needs of a user that requested the generation of the topology. The topology representation may provide a dynamic view of the stack as changes occurs. The topology representation may then be presented 250, to the user for example.

The collection, processing, and storage of topology is metadata driven. The solution may be expanded to other types of layers with incremental changes, with the changes being related to identifying correct sets of identifiers that have hints to interfacing points with other stacks. Because representing collected configuration, processing logic, and final topology are centered on schema, deriving a topology can proceed in a standardized fashion while flexibly accommodating variations in the type of layers analyzed, with the actual additional development work being limited to adding new schemas that relate to the new layers.

The generated topology may be dynamic, and capable of illustrating current status and changes. Manual or automated events from one part of a stack will affect and trigger changes to adjacent or distant layers. The changes may be sustained and reflected in the modifications in the topology.

Figure 3:
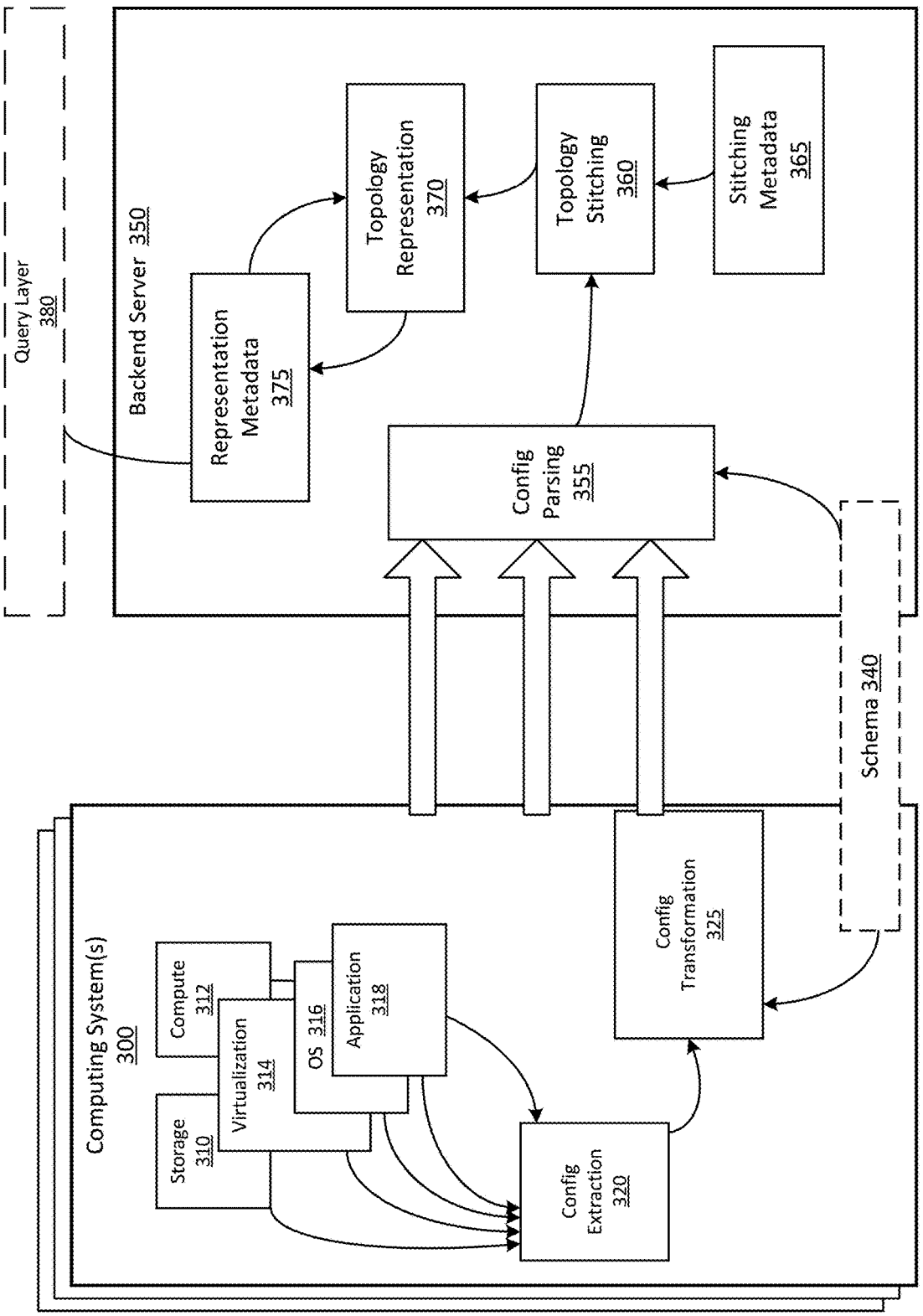
FIG. 3 is an illustration of operations for generation of an end-to-end topology according to an example.

FIG. 3 is an illustration of operations for generation of an end-to-end topology according to an example. Operations for generation of an end-to-end topology relate to one or more computing systems 300 for on-premises actions in relation to each of the layers of an infrastructure stack and a backend server 350. The computing system 300 includes an infrastructure stack that further includes any combination of hardware, firmware, and/or software, as will be described further below. In some examples, the computing system 300 may be utilized by an entity (e.g., a user, an organization), and the entity may be a customer of a vendor that provides support, management, and/or other services with respect to one or more layers of the computing system 300. The computing system 300 may be located on premise at a data center or colocation center of the entity. In some examples, the backend server 350 is operated by the vendor. The computing system 300 may be remote to the backend server 350, and communication between computing system 300 and backend server 350 may be facilitated by a network. The vendor may utilize the techniques described herein to gain end-to-end visibility regarding the computing system 300 and to leverage that visibility to provide support and management services with respect to the computing system 300.

The computing system 300 and backend server 350 may share a schema 340. The schema 340 may provide a standardized format for use in generation of the end-to-end topology. The description provided herein may be described in relation to a particular computing system 300, but the backend server may provide topology services for each of multiple computing systems 300 (e.g., computing systems at same or different locations, computing systems belonging to same or different end users or customers, or computing systems that are alike or different in various other characteristics).

As illustrated in FIG. 3, the computing system 300 may perform configuration extraction 320 to obtain configuration information from all or a subset of a plurality of layers of an infrastructure stack. The plurality of layers may include, but are not limited to, application 318, operating system 316, virtualization 314, compute 312, and storage 310. Each layer in the infrastructure stack has visibility into configuration of entities that are managed by that layer. For example, the computing system 300 may utilize available collectors to obtain configuration values for each of the domains for the layers of the stack. Collectors may be open source, provided by vendors, or otherwise available, and may include, e.g., APIs (application programming interfaces), SDKs (software development kits), or other tools such as Prometheus or Telegraf). Such collectors may be leveraged for each of the layers of the stack for which there is interest. The configuration values for each layer may be extracted independently without requiring custom tooling for such operation by virtue of using available collectors. In some examples, the collectors may be enabled by, for example, a call or instruction from the backend server 350 or from the computing system 300.

The computing system 300 may perform configuration transformation 325 of the extracted configuration data based on the schema format provided in the schema 340 and may transmit the set of transformed configuration data to the backend server 350. In this manner, the configuration data for each is transferred in a standard or generic format that can be efficiently processed by the backend server 350. The application of the schema format assists in supporting the independent extraction of configuration data from each layer because the form of such configuration data can then be transformed into a common or standardized format for transfer and processing at the backend server 350. The transformed configuration data of each layer may be transmitted to the backend server 350 as configuration files.

The backend server 350 receives data associated with the layers of the infrastructure stack, the data including the extracted configuration information from domains of the layers 310-318 of the infrastructure stack as transformed according to the schema 340. A stitching operation may be challenging to perform on premise (i.e., at the computing system 300) due to the multiple domains involved. The challenge may be intensified as the size or number of computing systems 300 increases. For this reason, the performance capability of the backend server 350 can be applied to this task.

The backend server 350 performs configuration parsing 355 of the received configuration information to generate a set of data for topology stitching. The parsing may include identifying configuration data relating to (e.g., indicative of) relationships between the domains of the infrastructure stack.

Once configuration information from all the layers of interest is parsed and available for processing, the backend server 350 may then perform topology stitching 360, which may utilize stitching metadata 365. The topology is stitched together utilizing the incoming configuration files, which may be referred to as "vertex" values and stored in multiple vertex tables (e.g., vertex and vertex tables may be concepts of graph theory), and utilizing the stitching metadata 365. The stitching metadata contains knowledge regarding the layers of the infrastructure stack, including information regarding the entities in each layer and their attributes. The topology stitching 360 is performed by matching like attributes or properties in the configuration data from the different layers of the infrastructure stack to determine the interconnections between the layers and generate a full end-to-end view of the infrastructure stack. In one specific example, topology may be stitched together based on the domain knowledge of layers encapsulated in stitching metadata to create a relationship between a virtualization layer and an operating system layer if, for example, VM BIOS UUID from a virtualization layer collector is the same as host_uuid from an OS collector. In this manner, the matching of attributes results in identifying sets of entities (which may be referred to as nodes) for which a relationship (which may also be referred to as an edge) should be created.

For example, the matching of attributes and creation of relationships may be expressed in the following queries for particular instances:

```
MATCH (a:MSSQLInstance),(b:ESXHost)
WHERE a.hostid = b.host id AND a.claimtag = b.claimtag
CREATE (a)-[r:HOSTED_ON]->(b)
RETURN a, b, r
MATCH (a:MSSQLDatabase),(b:MSSQLDatabaseFile),(c:DataStore)
WHERE a.id = b.database_id AND b.vhd_id = c.vhd_id AND a.claimtag =
   b.claimtag
CREATE (a)-[r:STORAGE_ASSOCIATION]->(b)
RETURN type(r)
```

The topology stitching 360 may include the generation of a DAG (Directed Acyclic Graph) to represent the end-to-end topology of the infrastructure stack. In operation incremental changes in configuration will arrive at the vertex tables, thus making each such vertex table a streaming element to perform topology stitching as the configuration of an infrastructure stack changes over time. It is noted that not all identified entities will be nodes in a final graph of the topology of an infrastructure stack as such entities may not be relevant.

The stitching metadata 365 may include information regarding entities of the multiple domains and attributes of such entities and rules based on which attributes can be matched to formulate relationships. Performing the stitching operation in a metadata driven fashion assists in supporting an efficient, generic, and extensible stitching infrastructure. The metadata may be used to identify how each layer of any type is structured. Because of this, the topology stitching may be utilized with any layer, and can be extended to different types of layers through the addition of appropriate metadata for such layers.

In a particular implementation, a DSL (Definition Specification Language) describes tags of sets of properties or attributes that should be matched across entities and across same or different domains. Whenever a topology stitching job is triggered, the backend server 350 refers to the DSL to determine relationships.

Upon completion of the topology stitching 360, the backend server 350 provides the stitched topology to a topology representation operation 370. The generation of the topology representation may include accessing representation metadata 375 to receive guidance on the form of the representation. The representation metadata 375 may be based on data from a query layer 380 to establish the desired representation. The form of the topology representation may vary depending on the specific requirements for a query. For example, the topology may be represented as a new or current topology graph, in the form of a relational view, as a topology evolving over time, or in another form.

Figure 4:
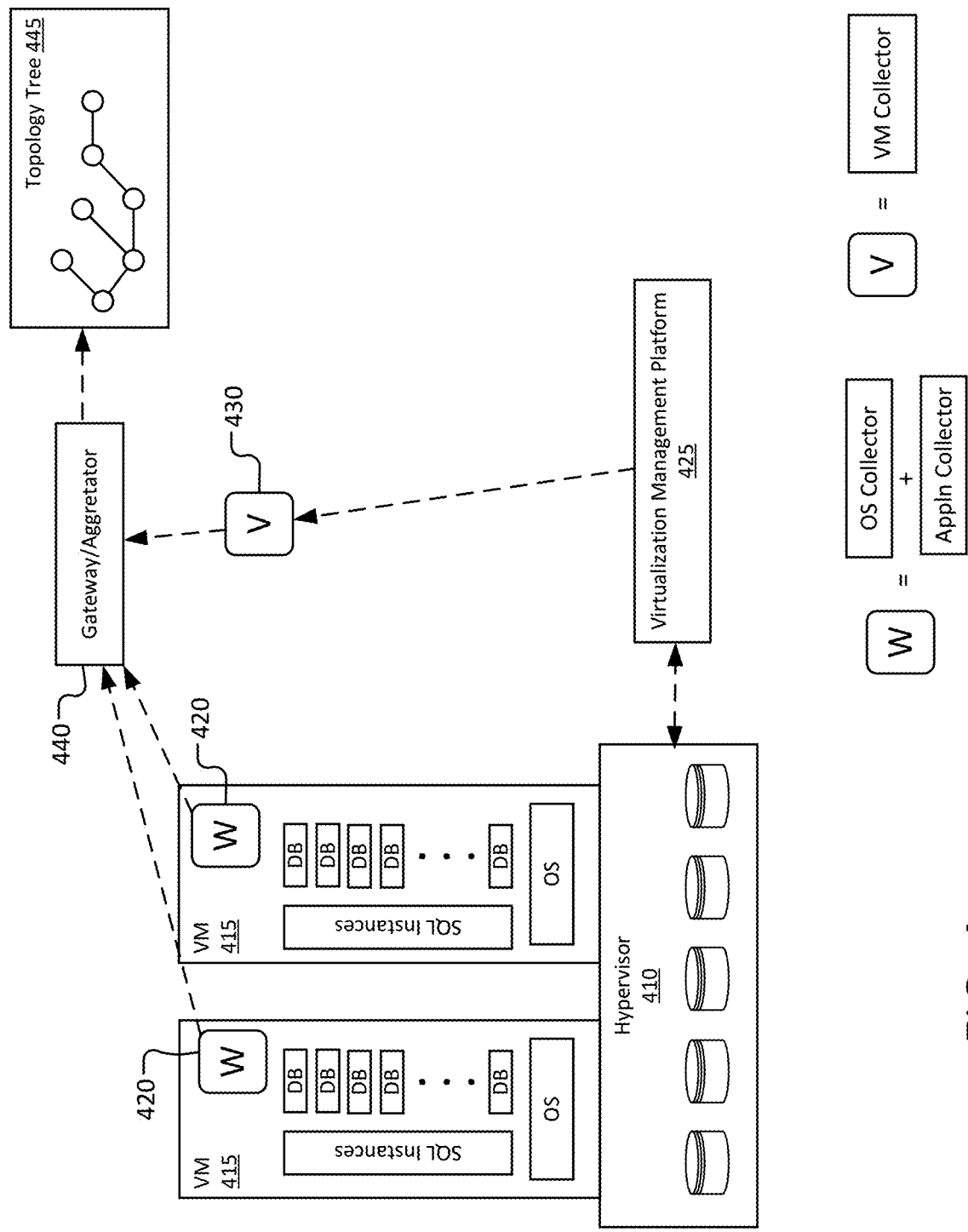
FIG. 4 illustrates an example of configuration extraction.

FIG. 4 illustrates an example of configuration extraction. Configuration extraction may be performed by a computing system, such as the configuration extraction 320 performed by the computing system 300 as illustrated in FIG. 3. Examples described herein may include multiple modular, stack-layer-specific configuration collectors. In this manner, each configuration collector may operate consistently with the protocols for an associated or corresponding layer or layers. The multiple configuration collectors may be independently executable, with minimal dependency between entities or objects reported by a single collector. The operation of each collector may be limited to the data points or keys that are necessary to stitch the relationship between one or two neighboring layers for efficiency.

FIG. 4 illustrates an example of multi-domain configuration collection including plugins for an application, an operating system, and a virtualization layer. As illustrated, W 420 refers to collectors for the OS and the application from virtual machines (VMs) 415 running on hypervisor 410, and V 430 refers to the virtualization layer collector from virtualization management platform 425. The collected configuration data may be directed to a gateway/aggregator 440 for generation of a topology tree 445 for processing.

Each collector may address the individual requirements for a particular layer/domain. There may be multiple ways of provisioning a given layer that reflect in the reported entities and their attribute values. For example, for storage in a virtualized environment it may be possible to provision storage directly (e.g., direct attached storage, or DAS), as pass-through disks (e.g., as raw device mapping or RDM), as data stores managed by the virtualization layer (e.g., virtual disks or virtual machine file system (VMFS) data stores)), or as virtual volumes (e.g., VMware VVols). The different foregoing storage types may report different entities and properties via a storage collector.

Figure 5A:
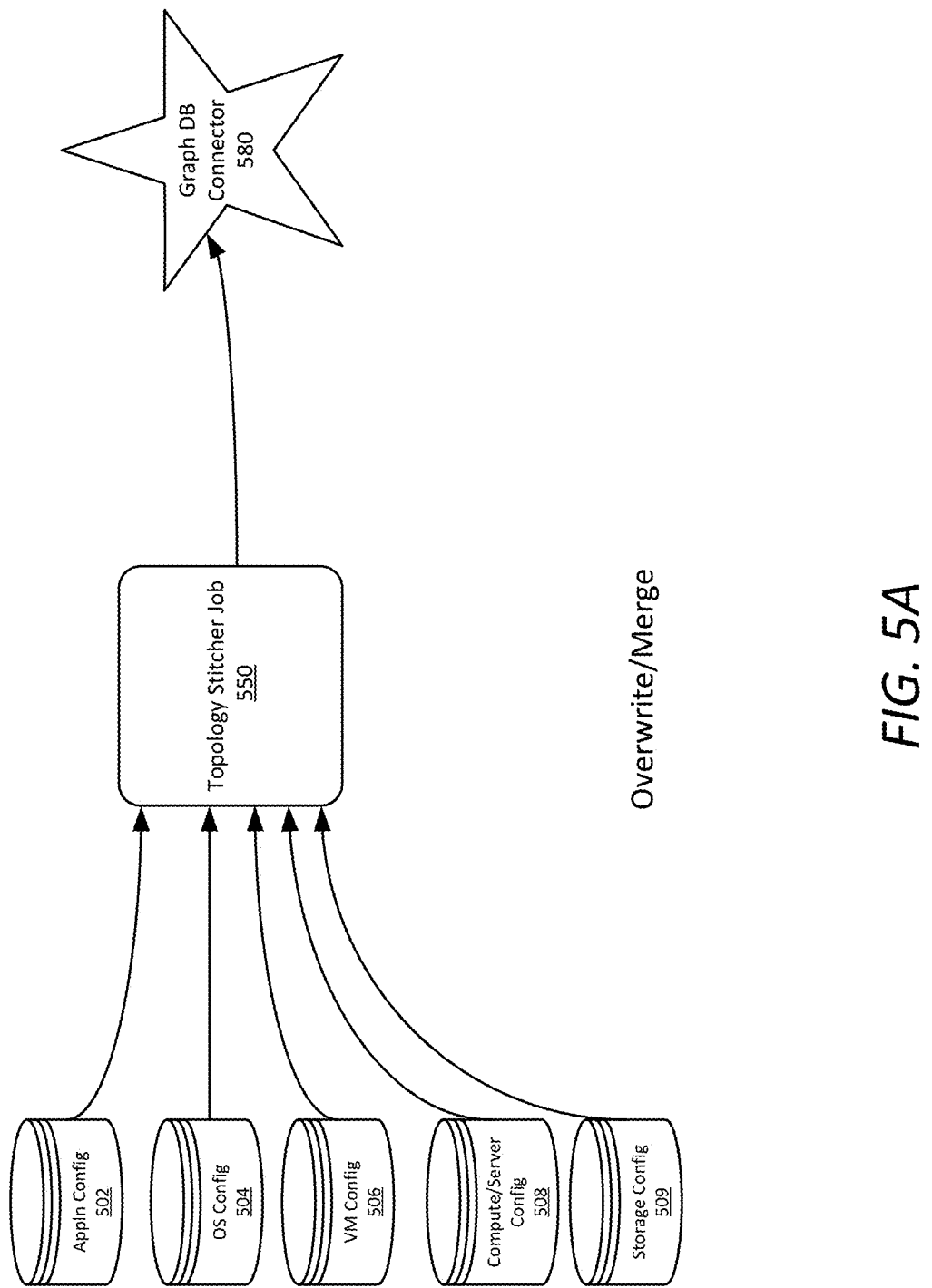
FIGS. 5A-5C illustrate example approaches for topology stitching.
Figure 5B:
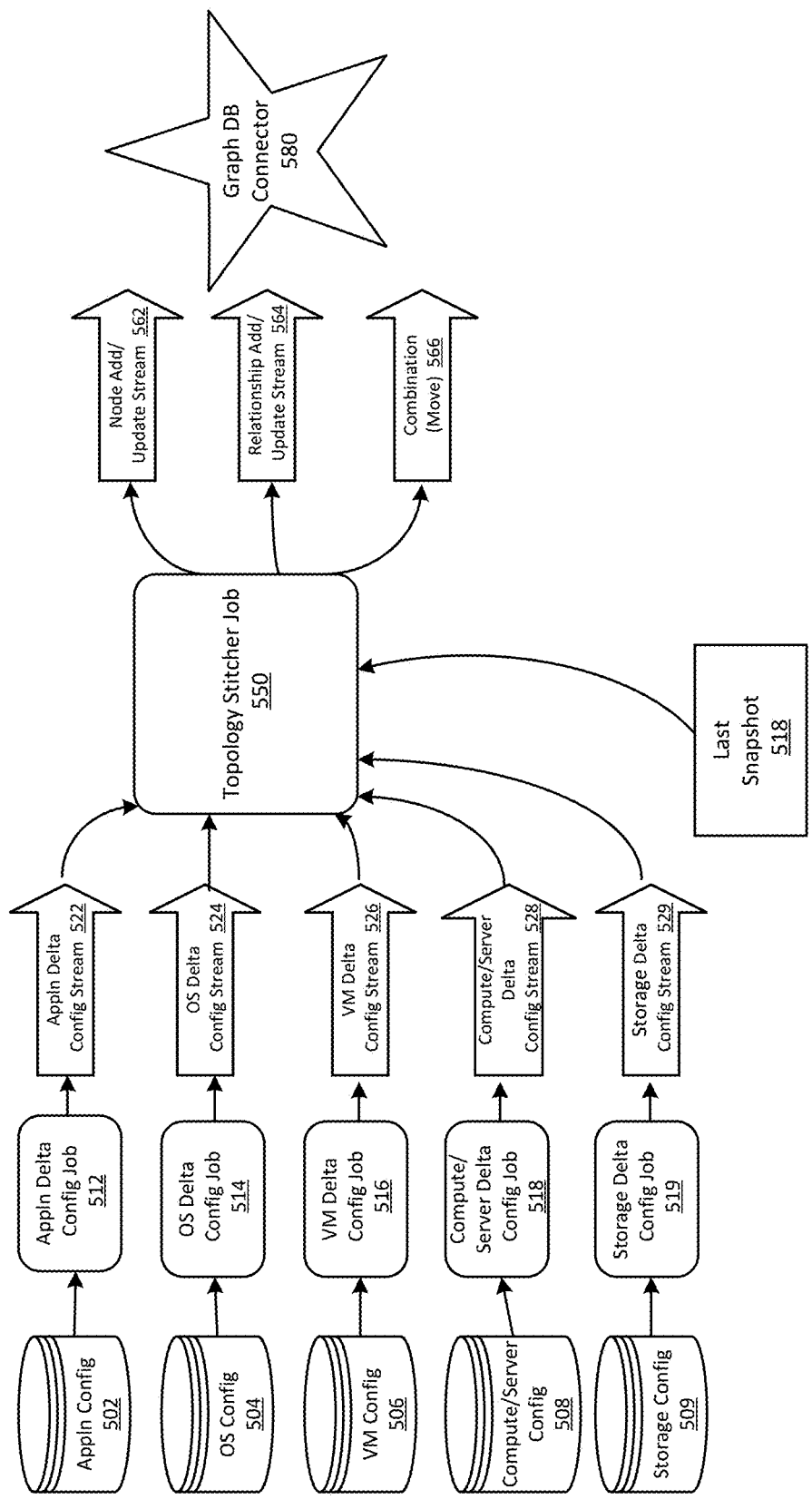
Figure 5C:
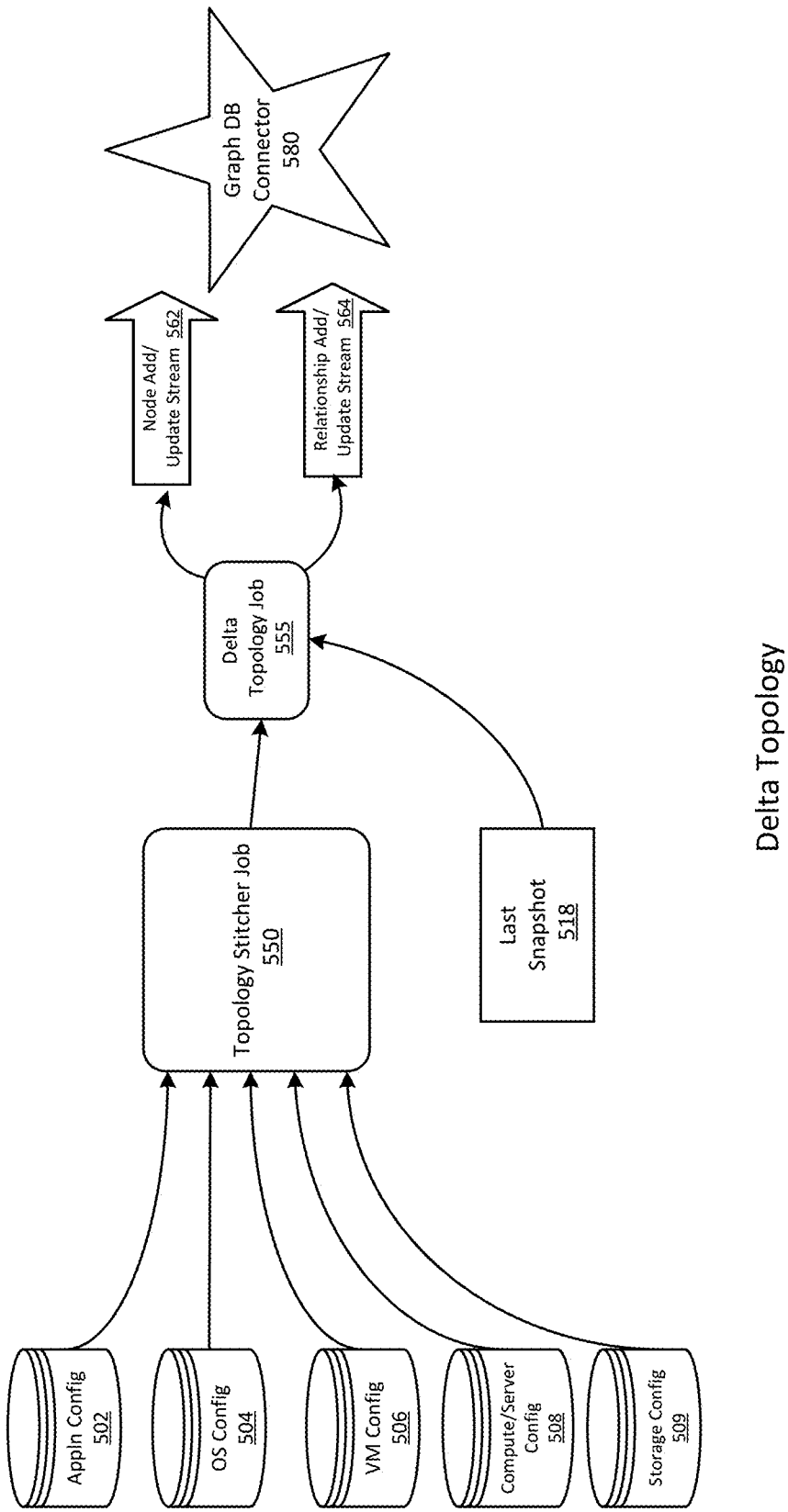

FIGS. 5A-5C illustrate example approaches for topology stitching. One or more approaches may be applied in performing topology stitching in end-to-end topology processing, such as topology stitching 360 performed by a backend server 350 as illustrated in FIG. 3. In intermediate stages of processing, an operation may:

(a) Overwrite a previous topology view with a new topology view.

(b) Store a history of the complete topology views in a data lake; or (c) Capture changes of topology and store delta values (change values).

The approaches to topology stitching that may be implemented may include, but are not limited to:

(1) Overwrite/Merge—In a first approach, FIG. 5A illustrates topology stitching including an overwrite or merge operation. As illustrated, configuration files are received (such as from a computing system 300) for an infrastructure stack including multiple domains, such as the illustrated application configuration 502, OS configuration 504, virtualization configuration 506, compute configuration 508, and storage configuration 509. The configuration files are then directed to a topology stitcher job 550, and to a graph database connector 580.

The generated topology of a configuration stack may be maintained in the form of a view or "snapshot" that represents the complete topology at a particular time. In the first approach, the complete topology is stitched every time new snapshots are received, with the prior topology graph being deleted and replaced with the new topology graph. Alternatively, the nodes and edges of the topology snapshots may be overwritten and merged with the existing topology graph. In this manner, a static view of a full end-to-end stack is presented.

However, overwriting all relationships and nodes with a graph database may be very expensive in terms of processing. Further, topology changes may be infrequent, and thus the dynamic portion of the topology may be a small fraction of nodes and relationships for a system. For this reason, in certain instances it may be inadvisable to overwrite all nodes and relationships in the generation of an updated topology, particularly if a large number of nodes (e.g., billions) are being addressed at high frequency. The topology processing may incur large costs in each operation in the DAG (Directed Acyclic Graph), and may, for example, require large data transfers be made.

As alternatives to the overwrite/merge approach to topology stitching, the following approaches allow incremental topology stitching:

(2) Delta Configuration—FIG. 5B is an illustration of delta configuration for topology stitching. If it is easily possible to perform event sourcing to directly identify events that have occurred in the infrastructure stack (rather than detecting changes in a full configuration), then it is easier to perform incremental stitching because the deltas are readily available. The DSL can be used to translate and categorize an event that has occurred to one of the below events:

(a) New entity;
(b) Deleted entity;
(c) New property for existing entity;
(d) Deleted property for existing entity; or
(e) Changed property for existing entity.

On premise collectors may not be capable of deriving the delta, and thus the events will need to be derived at the backend server 350 for example. However, this is generally difficult because it isn't obvious or generic what a certain property change might mean in different domain contexts, although it may be possible to discern the effect of a property change on topology graph.

In this approach, last snapshots of the topology of all entities are compared to the new snapshots, and the difference between the last snapshot (managed as vertex table) and the new snapshot is generated. This may be done as a first step in the DAG, converting the rest of the DAG to incremental operations if required. In a possible implementation, vertex diff-ing is a low cost operation that may be utilized, and can save a large amount of cost in the rest of DAG. Configuration changes are identified (which may be performed by, for example, using a SQL lag function) to obtain a last value of a column (in, for example, SQL or Spark SQL), and comparing this last value with a new value. Such a configuration change could be any of the events (a)-(e) identified above.

As this is illustrated in FIG. 5B, configuration files are received (such as from a computing system 300) for multiple domains, such as the illustrated application configuration 502, OS configuration 504, virtualization configuration 506, compute/server configuration 508, and storage configuration 509, which are respectively received by application delta processing job 512, OS delta processing job 514, VM delta processing job 516, compute/server processing job, and storage processing job. The resulting delta data results in configuration data streams, illustrated as application delta configuration stream 522, OS delta configuration stream 524, virtualization delta configuration stream 526, compute/server delta configuration stream 528, and storage delta configuration stream 529.

The delta configuration streams together with a last snapshot 518 are received by the topology stitcher job 550. For the delta configuration, the topology stitcher job 550 presents a node add/update stream 562, a relationship add/update stream 564, and a combination (or move) add/update stream 566 to the graph database connector 580.

The delta values are thus provided to the topology stitching algorithm, and propagated through the graph to reflect any changes in nodes/edges. The changes could be entirely new edges or changing an end of the edge (a move event, such as a VM moved from host A to B). Pruning of the graph is further required to remove any unrelated nodes or relationships that are not part of the last snapshot.

(3) Delta topology—FIG. 5C is an illustration of delta configuration for topology stitching. In this approach, a complete topology is stitched based on the new configuration for all entities. As illustrated, configuration files are received (such as from a computing system 300) for multiple domains, such as the illustrated application configuration 502, OS configuration 504, virtualization configuration 506, compute/server configuration 508, and storage configuration 509. The configuration files are then directed to a topology stitcher job 550.

The data from the topology stitcher job and a last snapshot 518 are provided to a delta topology job 555. The delta topology job 555 generates a node add/update stream 562 and a relationship add/update stream 564, which are provided to the graph database connector 580.

An older topology graph may be stored in memory (and not in the graph database). A graph diff operation (to determine the difference between graphs) may be performed after stitching to make only a few operations in the DAG incremental. Graph diff processing may be computationally costly, as it requires vertex table diff and edge table diff. The edge table diff may be costly because it needs a GroupBy operation, followed by sorting on destination vertex ID, and then the diff operation. Further, Spark (or other program) is required to maintain the edge table.

Various mechanisms for topology stitching will now be described. Topology stitching includes identifying a final set of related entities for the topology, and various mechanisms may be applied to identify the final set of related entities. These mechanisms provide metadata driven stitching, wherein, for example, DDL (Data Definition Language) statements can be generated to derive relationships between entities. A topology stitching mechanism may include, for example, one of the following:

(1) GraphDB-driven stitching—In this approach, a graph database query language is used to create relationships between entities. Additional statements are generated by the DDL to create unique constraints on nodes and edges as applicable for the domain.

(2) Spark/SQL joins—In this approach, Spark SQL or regular SQL joins are used to derive relationships between entities. This may be a multi-step process, including time-evolving topology, incremental projection layer, etc. Once relationships are formed, an incremental/merge approach may be applied to write to graph database as the presentation database.

In some examples it be beneficial to embed information around configuration changes in the topology graph. A brute force approach would be to maintain complete snapshots of topologies at different timestamps and have a series of config events separately stored. However, a more compact representation of topology can be provided to evolve over time. Each node, edge and property of node or edge may be provided a start and end timestamp associated with it so that topology at any point of time can be derived by limiting querying to a range of timestamps. To obtain a new (latest) topology, all nodes, edges, and properties that have no end timestamp associated with them may be selected. This operation can provide a rich and succinct way of representing topology and config events over time.

A topology may also be represented in a traditional relational table format, rather than in a graph. However, for large trees, path stitching needs to happen on read, which can be very expensive. If a relational table is limited to source and destination, the path stitching would require jumping over multiple hops in the table to determine the path. For this reason, a relational table includes root entity identifiers for each relationship in the RootedRelationship table so that every relationship is put in context. A relationship can be in scope for multiple root entities (such as Host→Server) and a relationship can be part of many virtualized applications and application instances. Complexity is thus moved on-write, with a separate path building job being responsible for populating all root entities for all relationships. With this representation, all relationships associated with a particular root entity can be retrieved and topology can be built on read in a simple manner.

In one possible example, a rooted relationship may be represented as follows:

```
trait RootedRelationship {
  val src_name: String
  val src_id: String
  val src_uid: String
  val src_type: String
  val src_timestamp: Long
  val sre_domain: String
  val src_file_id: String
  val dst_name: String
  val dst_id: String
  val dst_uid: String
  val dst_type: String
  val dst_timestamp: Long
  val dst_domain: String
  val dst_file_id: String
  val rel_id: String
  val rel_name: String
  val rel_type: String
  val rel_timestamp: Long
  val root_uid: String
  val root_timestamp: Long
  val claimtag: String
  val aggregator_id: String
```

However, other representations of the rooted relationship may also be used. For example, complex types in relational databases may be leveraged to represent node and edge as nested structures for relationships.

Figure 6:
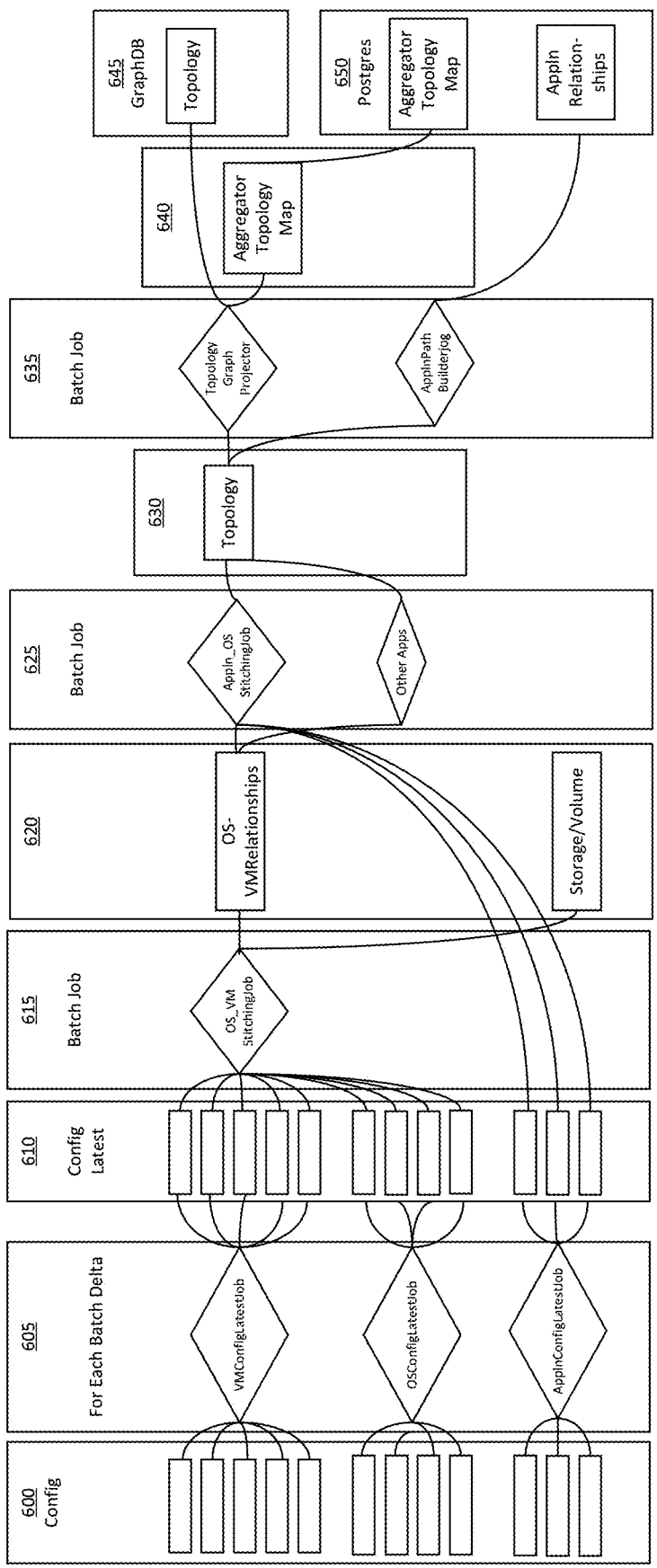
FIG. 6 illustrates an example of modular/multi-stage stitching.

FIG. 6 illustrates an example of modular/multi-stage stitching. Examples described herein may provide optimizations for performance, scale, and/or efficiency in the provision of topology stitching. As illustrated in FIG. 6, a multi-stage topology stitching pipeline process is provided. Providing a multi-state process allows for modularization of topology stitching, particularly since three or more domains may be involved.

In a particular example, operation system and virtualization environments may be common across many or all environments, and associations between OS and VM entities are independent of applications hosted on them. For this reason, OS and VM topology can be stitched as a first step, followed by the stitching of other domains.

As shown in FIG. 6, a topology stitching pipeline may include receiving configuration data from a first set of datastores at stage 600, wherein configuration values for each batch for VM, OS, and application are processed to identify latest values, such as by evaluating the relevant timestamps, and as a second set of datastores at stage 605 to identify the latest configuration values at stage 610.

The pipeline then may provide for an OS and VM stitching job at stage 615 (which may include a batch job to be performed, e.g., every half hour, or other period) to generate OS and VM relationships and volume associations outputted at stage 620, and generate data for storage/volume. The pipeline then may proceed at stage 625 with stitching applications to the previously generated OS-VM relationships. From the application and OS-VM stitching job at stage 625, a topology is generated at stage 630.

From the topology generated at stage 630, data may be provided to a topology graph projector and application path build job 635. The topology graph projector may deliver to the topology to GraphDB 645. The topology graph projector also may provide a result to an aggregator topology map at stage 640 that is then presented to a database 650 (e.g., Postgres). At stage 635, an application path build job may also generate application relationships from the topology and deliver the application relationships to the database 650.

Operation may be further improved by using a claimtag as a filter criteria to separate the vertex information to a different delta lake to make the information small enough to fit in the memory of each machine. Operations may further include performing a merge locally, or using z-order on the claimtag to provide a faster join performance.

In terms of a graph database representation, the topology is a natural graph. Reported entities are reported as nodes (vertices) of the graph, where each vertex has a set of properties that get reported. Most of the "edges" (relationships) of the graph are derived based on these properties by the topology stitching algorithm. This view makes it simple to retrieve an entire topology tree associated with an entity based on graph query language. Further, complex queries can be performed on the graph to gain insights from the network.

Figure 7:
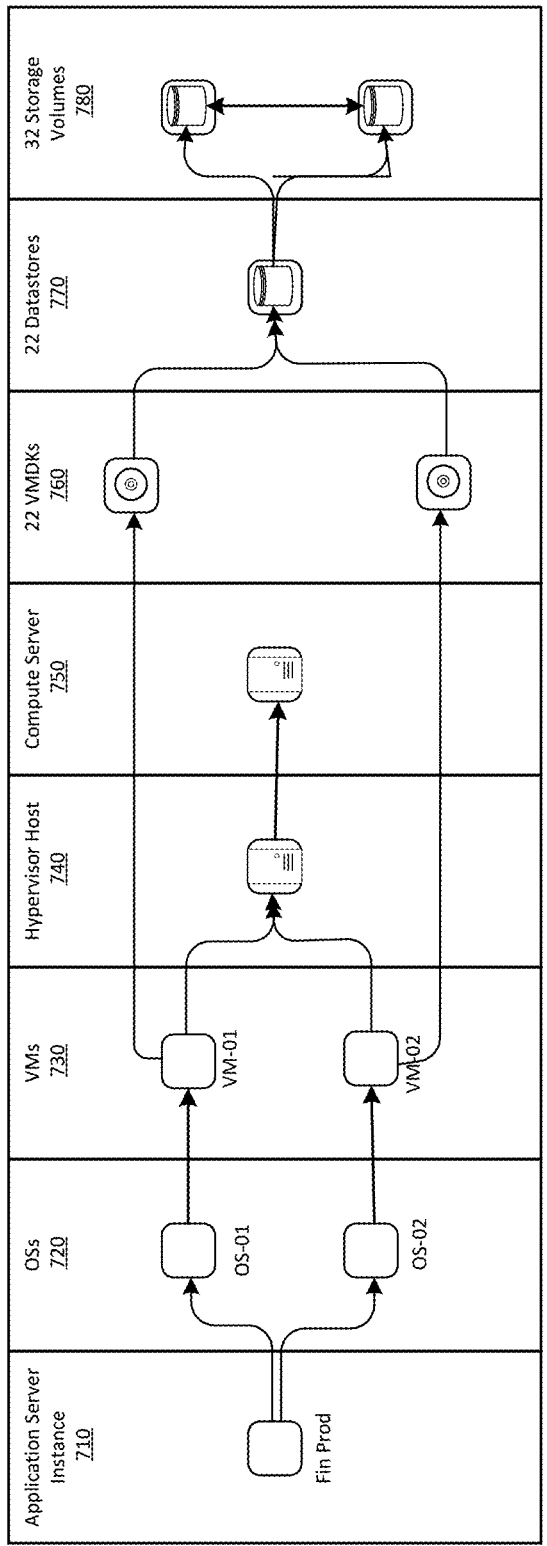
FIG. 7 illustrates a high level example of a topology representation.

FIG. 7 illustrates a high level example of a topology representation. In this simplified illustration, a topology for an infrastructure stack may provide information regarding the vertices and edges for each of the layers of an infrastructure stack. FIG. 7 specifically shows a non-exhaustive set of entities and relationships for a deployment on a set of domain elements.

As illustrated, the entities and relationships include an application server instance 710 that has relationship with one or more operating systems 720, shown as OS-01 and OS-02. The OSs 720 have relationships with one or more virtual machines (VMs) 730, VM-01 and VM-02 in this example. The VMs 730 then relates both to a hypervisor host 740 and to virtual machine disks (VMDKs) 760 (twenty-two disks in this example) The hypervisor host 740 further relates to a computer server 750. The virtual machine disks 760 further relate to datastores 770 (twenty-two datastores in this example). The datastores 770 then have the illustrated relationships with storage volumes 780 (thirty-two volumes in this example).

FIG. 7 may be a simplified form of a full topology. A full representation of an end-to-end topology for a complex infrastructure stack may include a very large number of interconnections between layers, and further may be a dynamic structure that illustrates the current and change conditions for the stack.

Figure 8:
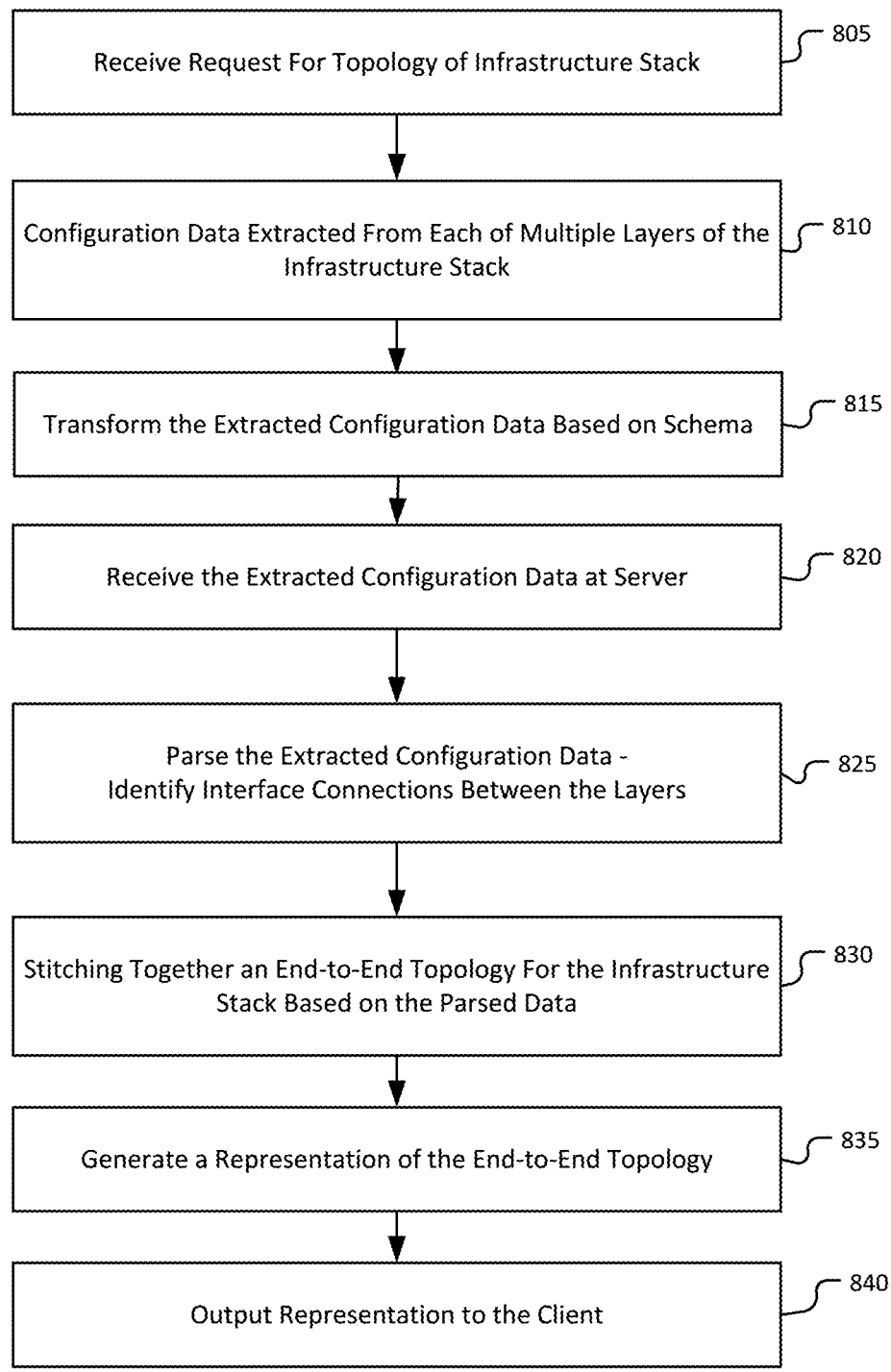
FIG. 8 is a flowchart to illustrate an example of a process for end-to-end topology processing.

FIG. 8 is a flowchart to illustrate an example of a process for end-to-end topology processing. An example process 800 for end-to-end topology stitching includes receiving a request or instruction related to generation of a topology for an infrastructure stack at block 805, such as a stack illustrated in FIG. 1. The requested topology may relate to multiple layers, which may be all or a sub-set of the layers of the infrastructure stack. Configuration data is extracted from each of the multiple layers of the stack at block 810, wherein the configuration data may be collected independently for each of the layers.

The process 800 further proceeds with transforming the extracted data according to a schema at block 815, wherein the schema may include a schema that is agreed between a computing system and a backend server, such as schema 340 illustrated in FIG. 3. In some implementations, blocks 810 and 815 may be performed by a computing system (e.g., 300). The extracted data may then be received at a backend server (e.g., 350) for processing at block 820.

The extracted configuration data is parsed to identify data for stitching of intersections between layers, including identifying interface connections between the layers of the stack, at block 825. The process 800 proceeds with stitching together an end-to-end topology for the infrastructure stack based on the parsed data at block 830, wherein the stitching may include one of overwriting or merging a prior topology, generating a delta configuration, or generating a delta topology, as illustrated in FIGS. 5A-5C. The stitching of the topology may include, for example, application of a pipeline for efficient processing of topology, such as illustrated in FIG. 6.

The process 800 then proceeds with generating a representation of the end-to-end topology at block 835, as described above, and outputting the representation (e.g., to a user) at block 840.

Figure 9:
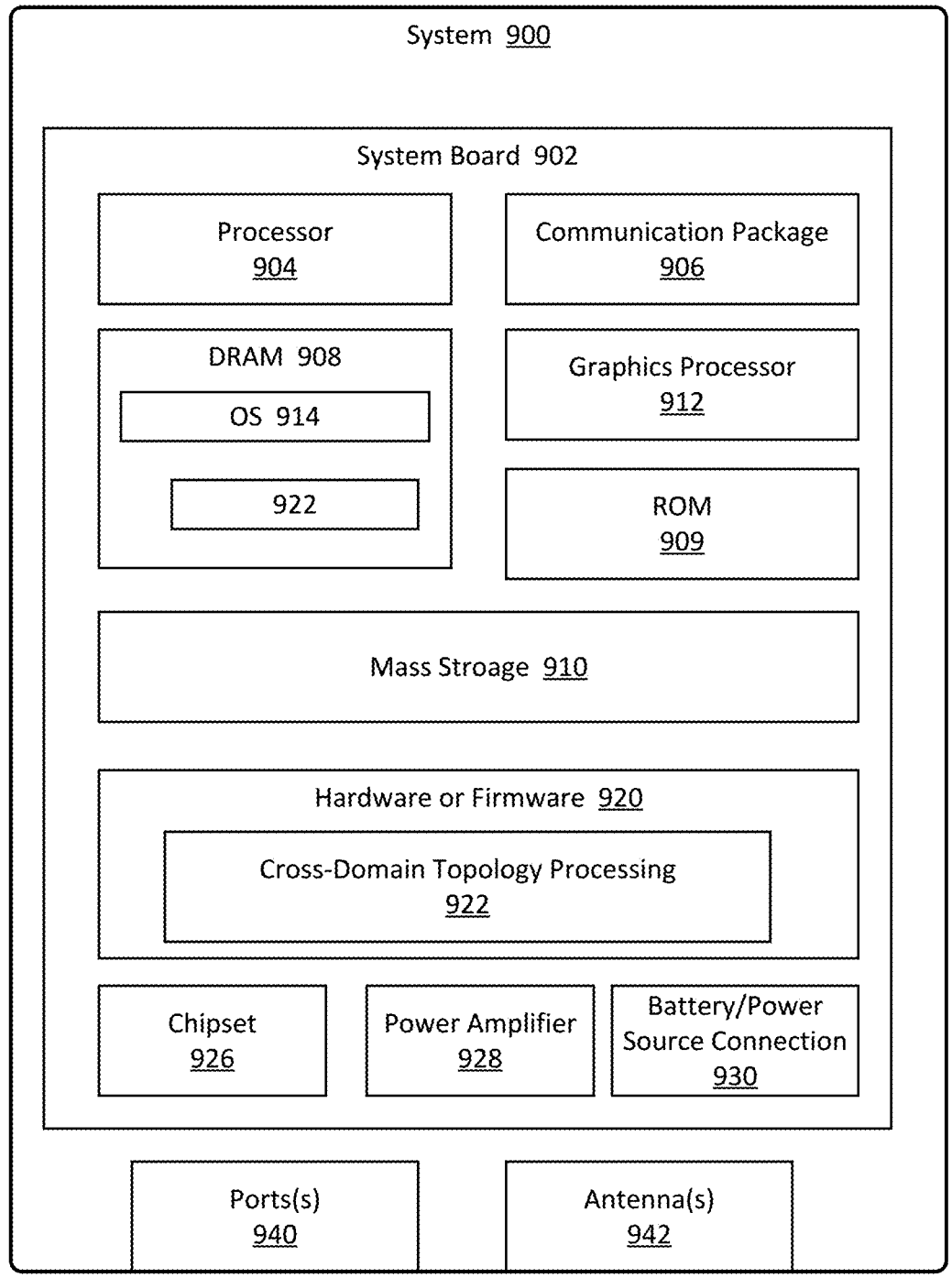
FIG. 9 is an illustration of an example system to provide end-to-end topology processing for an infrastructure stack.

FIG. 9 is an illustration of an example system to provide end-to-end topology processing for an infrastructure stack. The system 900 may provide for operations related to cross-domain configuration extraction (or receipt of extracted configuration information), topology mapping, and representation, such as illustrated in one or more of FIGS. 1-8. In some implementations, system 900 may serve as or form part of the backend server 350.

The system 900 includes cross-domain topology processing 922, which may be provided as hardware or a combination of hardware and software instructions. For example, the cross-domain topology processing 922 is shown as within hardware or firmware 920 and additionally or alternatively within DRAM memory 908. The cross-domain topology processing 922 may include cross-domain configuration extraction or receipt of extracted configuration information, topology mapping, and representation to enable users to view topology information over a range of layers of an infrastructure stack.

System 900 houses a system board 902. The system board 902 may include a number of components, including but not limited to a processor 904. The system 900 may further include at least one communication package or chip 906. The communication package 906 is coupled to one or more antennas 942. The system may further include volatile memory (e.g., DRAM) 908, nonvolatile memory (e.g., ROM) 909, a graphics processor 912, a chipset 926, a battery or power source connection 930, a power amplifier 928, a mass storage device (such as a solid state drive or hard disk drive) 910, and one or more ports 940 for wired connection. The mass storage 910 may include, but is not limited to, storage of data related to end-to-end topology processing for an infrastructure stack, including schema data, stitching metadata, and representation metadata. These components of the system may be connected to the system board 902, mounted to the system board, or combined with any of the other components.

System 900 further includes an operating system 914, such as illustrated in DRAM 908. In various implementations, the system 900 may be, for example, a server, storage element, or other physical element related to a hyper-converged infrastructure. Examples may be implemented using one or more memory chips, controllers, CPUs (Central Processing Unit), GPUs (Graphics Processing Units), microchips or integrated circuits interconnected using a motherboard, an application specific integrated circuit (ASIC), a field programmable gate array (FPGA), or other logic. The term "logic" may include, by way of example, hardware and/or combinations of software and hardware.

The following clauses and/or examples pertain to further examples. Specifics in the examples may be applied anywhere in one or more examples. The various features of the different examples may be variously combined with certain features included and others excluded to suit a variety of different applications. Examples may include subject matter such as a method, means for performing acts of the method, at least one machine-readable medium, such as a non-transitory machine-readable medium, including instructions that, when performed by a machine, cause the machine to perform acts of the method, or of an apparatus or system for facilitating operations according to examples described herein.

In the description above, for the purposes of explanation, numerous specific details are set forth in order to provide a thorough understanding of the described examples. It will be apparent, however, to one skilled in the art that examples may be practiced without some of these specific details. In other instances, well-known structures and devices are shown in block diagram form. There may be intermediate structure between illustrated components. The components described or illustrated herein may have additional inputs or outputs that are not illustrated or described.

Various examples may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various examples may be provided as a computer program product, which may include a computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, a non-transitory computer-readable storage medium has stored thereon data representing sequences of instructions that, when executed by a processor, cause the processor to perform certain operations.

Processes can be added to or deleted from any of the methods described above and information can be added or subtracted from any of the described messages without departing from the basic scope of the present examples. It will be apparent to those skilled in the art that many further modifications and adaptations can be made. The particular examples are not provided to limit the concept but to illustrate it. The scope of the examples is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

What is claimed is:

1. A non-transitory computer-readable storage medium having stored thereon executable computer program instructions that, when executed by a processor, cause the processor to perform operations comprising:
   receiving, at a server, a set of configuration data for an infrastructure stack and a plurality of domains of the infrastructure stack;
   parsing the received set of configuration data;
   stitching together an end-to-end topology for the plurality of domains of the infrastructure stack based at least in part on the received set of configuration data, wherein the stitching comprises:
      matching like attributes in the received set of configuration data from different layers of the infrastructure stack,
      based on the matching, creating a relationship between a virtualization layer and an operating system layer in the different layers of the infrastructure stack, and
      based on the relationship, stitching the virtualization layer and the operating system layer as part of the end-to-end topology; and
   generating a representation of the end-to-end topology of the infrastructure stack.

2. The non-transitory computer-readable storage medium of claim 1, wherein the processor further performs operations comprising:
   transforming the received set of configuration data to a standard format according to a schema between the server and a remote computing system.

3. The non-transitory computer-readable storage medium of claim 1, wherein the stitching of the end-to-end topology is based at least in part on stitching information regarding entities of the plurality of domains.

4. The non-transitory computer-readable storage medium of claim 3, wherein the processor further performs operations comprising:
   identifying second configuration data relating to a second relationship between the entities of the plurality of domains.

5. The non-transitory computer-readable storage medium of claim 1, wherein stitching together the end-to-end topology includes one of:
   overwriting or merging a previous topology for the infrastructure stack;
   generating a delta configuration based on new configuration data for each of the plurality of domains;
   generating a delta topology based on a new configuration for all entities of the plurality of domains; or
   event sourcing for detected events.

6. The non-transitory computer-readable storage medium of claim 1, wherein the processor further performs operations comprising:
   initiating configuration processing that comprises a multi-stage topology pipeline for one or more batch or streaming jobs.

7. The non-transitory computer-readable storage medium of claim 1, wherein the plurality of domains include one or more of application, operating system, virtualization, compute, and storage domains.

8. The non-transitory computer-readable storage medium of claim 1, wherein the processor is further caused to perform operations comprising:
   upon completion of stitching together the virtualization layer and the operating system layer, initiating a second stitching process of other domains based on timestamps in the configuration data.

9. The non-transitory computer-readable storage medium of claim 1, wherein the relationship between the virtualization layer and the operating system layer comprises a first identifier matching a second identifier from the operating system layer in the different layers of the infrastructure stack.

10. The non-transitory computer-readable storage medium of claim 9, wherein the first identifier is a VM BIOS UUID from the virtualization layer, and wherein the second identifier is a HOST_UUID from the operating system layer.

11. A server comprising:
   a processor;
   a memory comprising a set of configuration data for a computing system; and
   a storage device, wherein the processor is to:
      receive the set of configuration data for an infrastructure stack and a plurality of domains of the infrastructure stack;
      parse the received set of configuration data;
      stitch together an end-to-end topology for the plurality of domains of the infrastructure stack based at least in part on the received set of configuration data, wherein the stitching comprises:
         matching like attributes in the received set of configuration data from different layers of the infrastructure stack,
         based on the matching, creating a relationship between a virtualization layer and an operating system layer in the different layers of the infrastructure stack, and
         based on the relationship, stitching the virtualization layer and the operating system layer as part of the end-to-end topology;
      generate a representation of the end-to-end topology of the infrastructure stack; and
      present the representation of the end-to-end topology to the computing system.

12. The server of claim 11, wherein the memory includes data for a schema between the server and the computing system, and wherein the received set of configuration data includes configuration data that is transformed to a standard format according to the schema between the server and the computing system.

13. The server of claim 11, wherein the processor is further to:
stitching metadata including information regarding entities of the plurality of domains, and wherein the stitching of the end-to-end topology is based at least in part on stitching metadata.

14. The server of claim 11, wherein stitching together the end-to-end topology includes one of:
overwriting or merging a previous topology for the infrastructure stack;
generating a delta configuration based on new configuration data for each of the plurality of domains; or
generating a delta topology based on a new configuration for all entities of the plurality of domains.

15. The server of claim 11, wherein the processor is further to:
initiating configuration processing that comprises a multi-stage topology pipeline for one or more batch or streaming jobs.

16. The server of claim 11, wherein the plurality of domains include one or more of application, operating system, virtualization, compute, and storage domains.

17. A method comprising:
collecting, at a computing system, configuration data for each of a plurality of domains of an infrastructure stack;
transforming the configuration data to a standard format;
transmitting, by the computing system to a backend server, the configuration data of the infrastructure stack, wherein the backend server is configured to stitch together an end-to-end topology for the plurality of domains of the infrastructure stack based at least in part on the configuration data, wherein the stitching comprises:
matching like attributes in the configuration data from different layers of the infrastructure stack,
based on the matching, creating a relationship between a virtualization layer and an operating system layer in the different layers of the infrastructure stack, and
based on the relationship, stitching the virtualization layer and the operating system layer as part of the end-to-end topology; and
receiving, from the backend server, a representation of the end-to-end topology of the infrastructure stack based on the configuration data.

18. The method of claim 17, wherein the configuration data is collected independently for one or more of the plurality of domains.

19. The method of claim 17, wherein transforming the configuration data comprise transforming the configuration data according to a schema between the backend server and the computing system.

20. The method of claim 17, wherein the computing system comprises the infrastructure stack operated by a customer, and the different layers of the computing system are supported by a vendor.

* * * * *